US012755194B2

(12) United States Patent
Rosman et al.

(10) Patent No.: US 12,755,194 B2
(45) Date of Patent: Oct. 6, 2026

(54) SYSTEMS AND METHODS FOR ADJUSTMENT-BASED CAUSALLY ROBUST PREDICTION

(71) Applicant: TOYOTA RESEARCH INSTITUTE, INC., Los Altos, CA (US)

(72) Inventors: Guy Rosman, Newton, MA (US); Igor Gilitschenski, Toronto (CA); Xiongyi Cui, Somerville, MA (US); Stephen G. Mcgill, Broomall, PA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 825 days.

(21) Appl. No.: 18/099,579

(22) Filed: Jan. 20, 2023

(65) Prior Publication Data

US 2024/0249180 A1 Jul. 25, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2020/0320433 A1 10/2020 Wu
2021/0133846 A1* 5/2021 Xu .................... G06Q 30/0631
2021/0142479 A1* 5/2021 Phogat .................. G06T 11/206
2021/0192357 A1* 6/2021 Sinha ..................... G06N 3/094
2022/0398697 A1* 12/2022 Vahdat ................. G06N 3/0464
2023/0080693 A1* 3/2023 Hu ............................ G06T 5/70
382/275

OTHER PUBLICATIONS

Ranftl, et al., "Towards Robust Monocular Depth Estimation: Mixing Datasets for Zero-Shot Cross-Dataset Transfer", Aug. 2020 IEEE Transactions on Pattern Analysis and Machine Intelligence pp. (99):1-1.
La Torre, et al., "Mixing Deep Learning and Multiple Criteria Optimization: An Application to Distributed Learning with Multiple Datasets." arXiv preprint arXiv:2112.01358 (2021).
Kocaguneli, et al., "Combining multiple learners induced on multiple datasets for software effort prediction." In International Symposium on Software Reliability Engineering (ISSRE). 2009. http://2009.issre.net/papers/issre2009_245.pdf.
Yoon, et al., "RadialGAN: Leveraging multiple datasets to improve target-specific predictive models using Generative Adversarial Networks." In International Conference on Machine Learning, pp. 5699-5707. PMLR, 2018. http://proceedings.mlr.press/v80/yoon18b/yoon18b.pdf.

* cited by examiner

*Primary Examiner* — Ann J Lo
(74) *Attorney, Agent, or Firm* — Seyfarth Shaw LLP

(57) ABSTRACT

Prediction training systems that rely on small variation data sets instead of training the model using large passive data sets are disclosed. The smaller variation data sets are used to add loss terms that may mimic intervention. One or more models may be included that mimic the intervention by training with variation datasets. The variation datasets may be collected from such interventions in real world events. The model may mimic an intervention by replacing values in the prediction during a forward model computation.

20 Claims, 4 Drawing Sheets

SYSTEMS AND METHODS FOR ADJUSTMENT-BASED CAUSALLY ROBUST PREDICTION

TECHNICAL FIELD

Aspects of the present disclosure relate to prediction models for vehicles for autonomous and semi-autonomous vehicles, and more particularly to systems and methods to make prediction models robust to causal interventions and shifts between training distributions and actual usage conditions.

BACKGROUND

Autonomous and semi-autonomous vehicles rely on advanced intelligence of the systems both running on the vehicle and those used to train the vehicles to behave and respond to real-world events. These ego vehicles feature on-board systems that include artificial intelligence and neural networks trained according to prediction models of previously generated and/or recorded data. These models provide the ego vehicles a baseline for which the vehicle systems use to make spontaneous decisions when operating in a real-world environment. As the vehicle observes or senses certain stimuli in the operating environment or on the vehicle, the on-board systems rely on the models to predict upcoming events and apply controls to the vehicle according to those predictions.

Known prediction models are trained using passive data, including data previously obtained from other sources, events, and environments. This passive data is used and analyzed to generate prediction models which are, in turn, used to train an ego vehicle trajectory system, so that the ego vehicle is programmed to respond to stimuli in an appropriate manner. Prediction models based on passive data, however, have struggled to adequately train ego vehicles for real-world deployment.

SUMMARY

Aspects of the present disclosure provide improved systems and methods for generating prediction models to make the models more robust to causal interventions, better handle shifts between training distributions and actual usage conditions, and/or improve actions taken by a vehicle utilizing the prediction models.

According to one aspect, a method of training a prediction model is described. The method may include retrieving a first dataset comprising a base set and first variation dataset. The first dataset may be encoded and a predicate dataset may be retrieved from a second dataset. The second dataset may comprise a second variation dataset. The predicate dataset may be encoded and concatenated with the encoded predicate dataset to generate a concatenated dataset. The concatenated dataset may be decoded to generate a prediction result.

According to another aspect, a system for training a prediction model is described. The system may include one or more processors and a memory communicably coupled to the one or more processors. The memory may store a prediction system including instructions that when executed by the one or more processors train the prediction model. The prediction model may be trained by retrieving a first dataset comprising a base set and first variation dataset. The first dataset may be encoded and a predicate dataset may be retrieved from a second dataset. The second dataset may comprise a second variation dataset. The predicate dataset may be encoded and concatenated with the encoded predicate dataset to generate a concatenated dataset. The concatenated dataset may be decoded to generate a prediction result.

According to another aspect, a non-transitory computer-readable medium having program code recorded thereon for training a prediction model is disclosed. The program code may be executed by a processor and comprise program code for retrieving a first dataset comprising a base set and first variation dataset. The non-transitory computer-readable medium may further include program code for encoding the first dataset and program code for retrieving a predicate dataset from a second dataset. The second dataset may include a second variation dataset. Program code for encoding the predicate dataset may be included. Program code for concatenating the encoded dataset with the encoded predicate dataset to generate a concatenated dataset may be further included. Program code for decoding the concatenated dataset to generate a prediction result may also be included.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
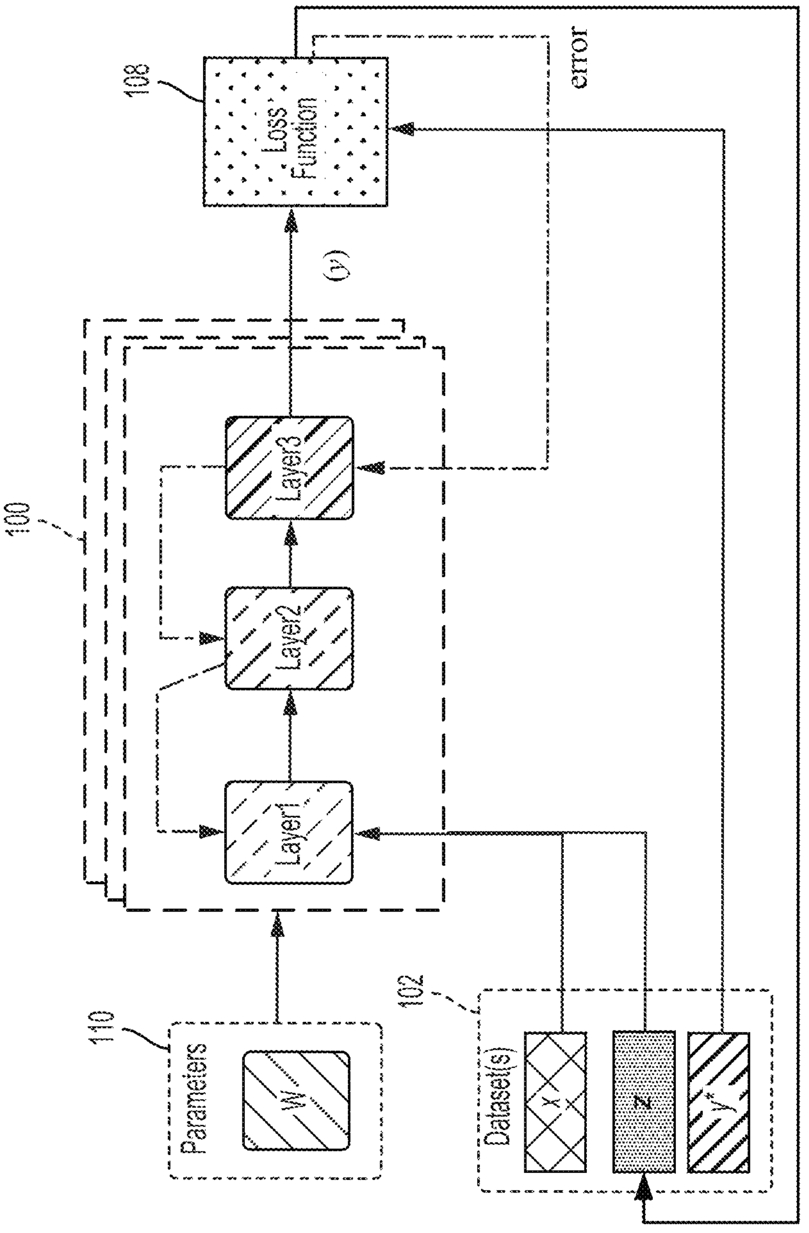
FIG. 1 illustrates a flow diagram for training a model according to aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. It will be apparent to those skilled in the art, however, that these concepts may be practiced without these specific details. In some instances, well-known structures and components are shown in block diagram form in order to avoid obscuring such concepts.

Aspects of the present disclosure provide system and methods for training a prediction model that performs probabilistic prediction/planning. While the systems and methods described herein related to prediction models for autonomous or semi-autonomous vehicles, aspects of the present disclosure may be applied to any prediction model relies on probabilistic predictions.

According to one aspect, instead of training the model using large passive data sets, the systems described herein may rely on small variation data sets and use those smaller variation data sets to add loss terms that may mimic intervention. As used herein, an "intervention" may include, for example, changing a scenario, such as a driver taking over from control from the ego vehicle, driving in a different city, having a different driver, or the like. Aspects of the present disclosure may include one or more models that mimic the intervention by training with variation datasets. The variation datasets may be collected from such interventions in real world events. The model may mimic an intervention by replacing values in the prediction during a forward model computation (i.e., in a neural network, passing the input through one or more sub-networks and outputting a prediction).

According to one aspect, these small variation data sets may include data collected during manual (non-autonomous) driving that is then specifically utilized to train a planner model that acts significantly different from the driver of the vehicle that was used to collect the data set in the first instance. This type of variation data may be valuable because the real-world observed data differs from what the model may have predicted. Adjusting the model with driving data obtained from an actual human driving a vehicle, particularly when it deviates from a predicted behavior, may be used to broaden the potential actions and controls of an ego vehicle when it encounters a similar set of stimuli.

According to another aspect, the variation data sets may include data sets generated during the operation of a vehicle piloted by, for example, a first planner model or other perception model or sensor, and then used to train a second planner model. The variation set may also include data collected from any source, provided such data is collected under a different scenario from the base set. The variation set could also include data collected with the same planner model, or same/different perception model, but with different run-time parameters than the base set.

According to another aspect the variation data sets may include data that focuses on one particular type of action, such as an unprotected left turn, to train a planner model that performs poorly when performing unprotected left turns (i.e., a left turn with no signal control).

According to another aspect, the disclosed systems and methods may collect data sets from a reckless driver and use that to train a prediction model, rather than collecting data sets from a safe driver. Data reflecting reckless or unexpected data may be more valuable than safe and expected behavioral data as it may inform the training model of additional behavioral possibilities for which the ego vehicle may advantageously use to avoid similar situations in real-world environments.

The inclusion of these variation data sets as additional loss terms may mimic the distribution of variation sets in a modified activation of the network in which intermediate activation of a base dataset is replaced with the intermediate activations from the variation sets' statistics.

FIG. 1 illustrates a flow diagram for training one or more machine learning models 100, according to an aspect of the present disclosure. In one configuration, base datasets (x) may be stored in a data source 102, such as a training server. The data source 102 may also store variation datasets (y*) corresponding to smaller variation datasets, as described herein.

The machine learning model 100 may be initialized with a set of parameters 100 (w). The parameters 100 (w) may be used by layers of the machine learning model 100, such as layer 1, layer 2, and layer 3, of the machine learning model 100 to set weights and biases. Layer 3 may be a fully connected layer. During training, the machine learning model 100 receives base datasets X to train the model 100. The base datasets (x) may be, for example, trajectories or other actions related to an ego vehicle, however, the datasets may also be any type of data used in probabilistic prediction or planning.

The machine learning model 100 may output a prediction (y) for one or more scenarios in base dataset (x). The prediction (y) may be received at a loss function 108. The loss function 108 may take variation datasets (y*) to add loss terms that mimic intervention by replacing the values in the prediction (y) with those in the variation sets. The prediction error may the difference (e.g., loss) between the predicted label (y) and the variation data (y*). The prediction error may be output from the loss function 108 to the machine learning model 100. The error may be back-propagated through the machine learning model 100 to update the parameters. According to one aspect, the training may be performed during an offline phase of the machine learning model 100.

According to another aspect, the output of the loss function 108 may become another dataset (z) and may be input into the one or more machine learning models 100 with base dataset (x) Those newly generated predictions and data may then be used in future and subsequent training operations on new datasets. The system may train on dataset (z) based on inferences made from dataset (x). In this manner the machine learning models; 100 may train themselves in a self-supervised, or weakly supervised fashion.

Figure 2A:
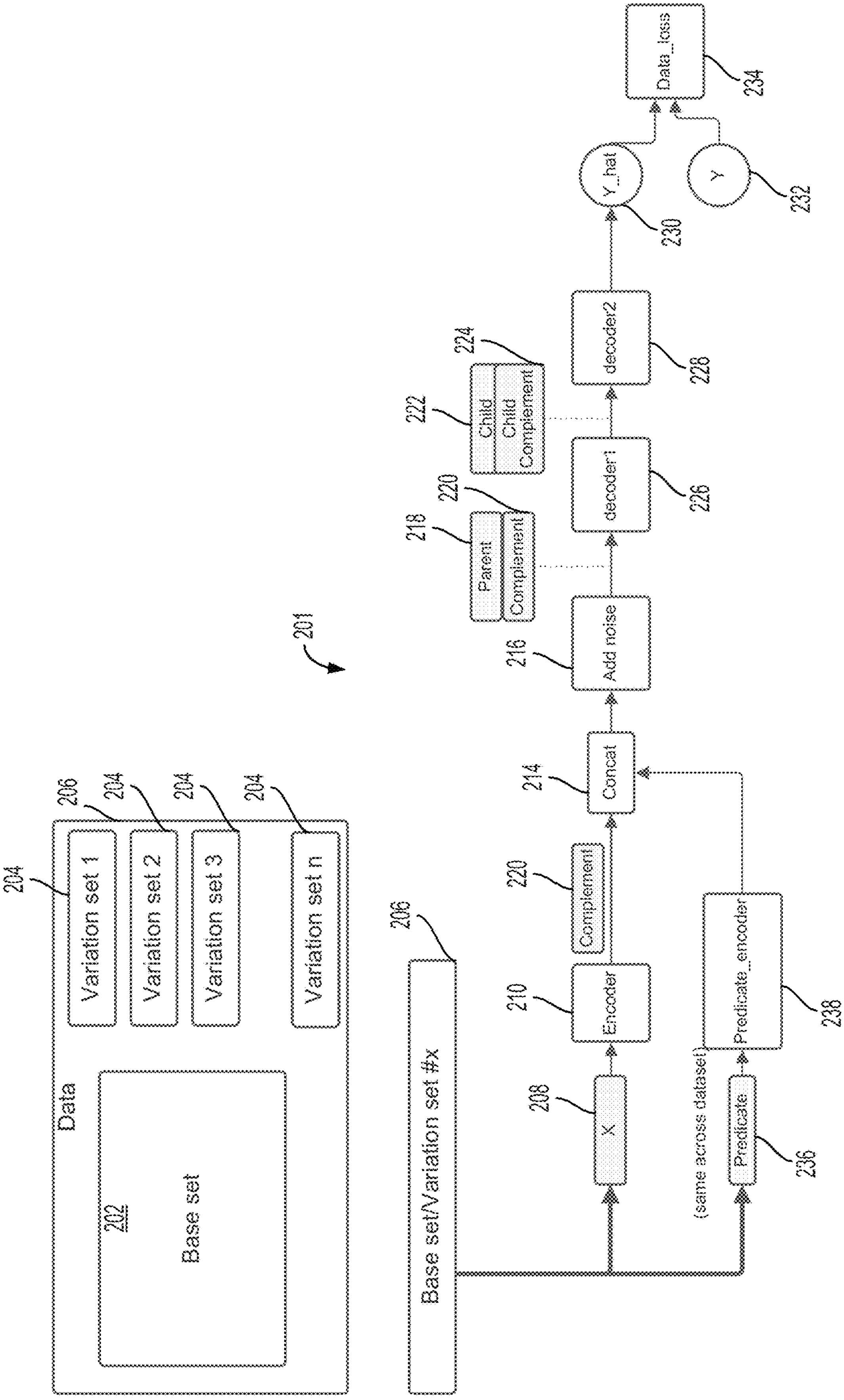
FIG. 2A depicts a training flow of a prediction model with a variation dataset according to aspects of the present disclosure.
Figure 2B:
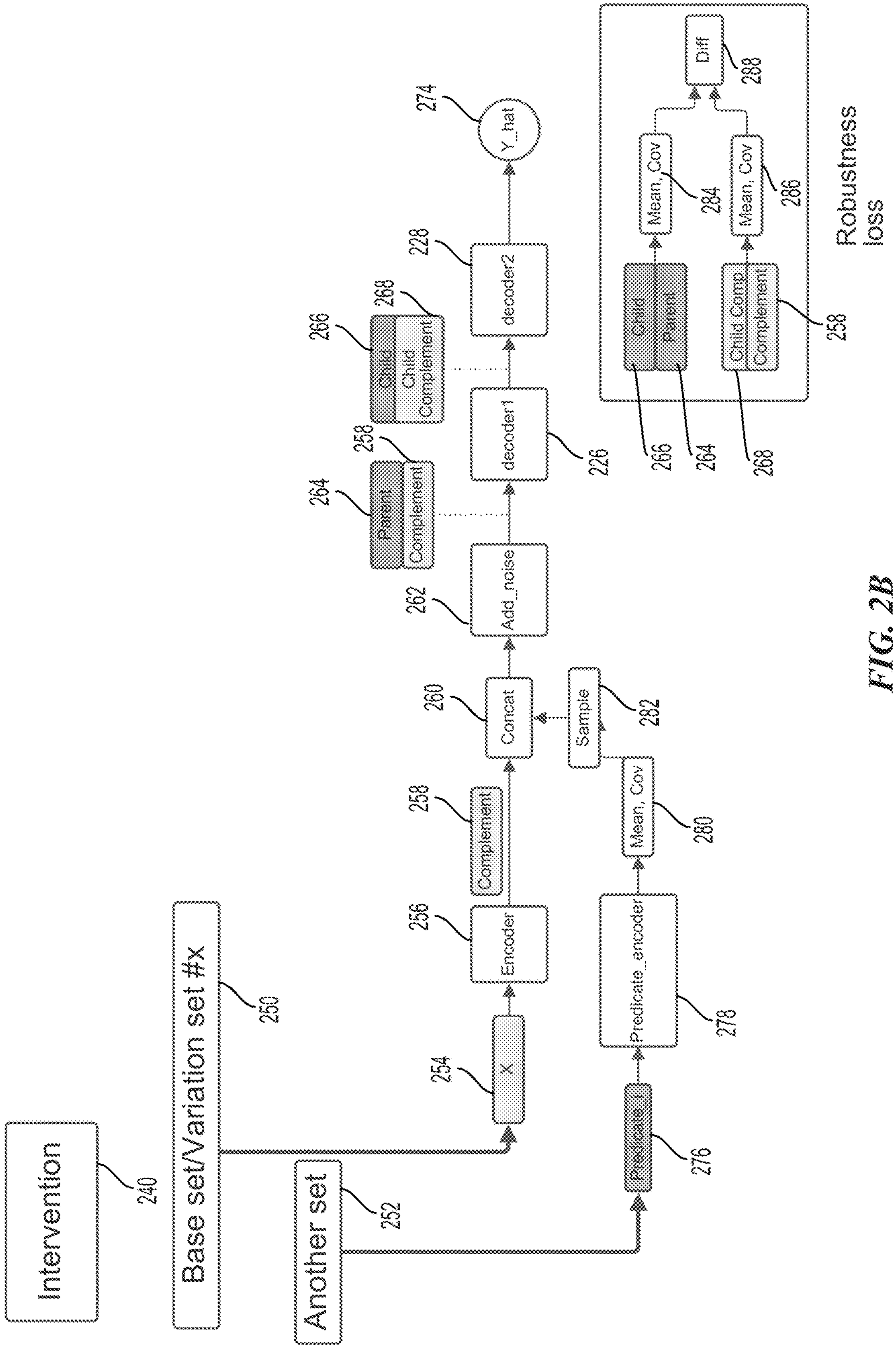
FIG. 2B depicts a training flow of a prediction model with intervention according to aspects of the present disclosure.

Referring now to FIGS. 2A-2B flow diagrams depicting a standard prediction model and one for a variation dataset and intervention, respectively, according to one or more aspects of the present disclosure. The prediction models may include any number of multiple sub modules, which could include neural networks or other learnable algorithms. A normal prediction run/training path 200, as show in FIG. 2A includes obtaining data 206 (Base set 202/Variation set #x 204), which may include scenario data (trajectories, maps, etc.), X 208 and predicate data 236 which may be specific to each base 202/variation data set 204. This data 206 may be passed into an encoder 210 and predicate_encoder 238, respectively. According to one aspect of the disclosure, the prediction model may rely, in part, on known encoder/decoder networks. The result of both modules (encoder 210, predicate_encoder 238) may be concatenated 214 (e.g., concat), supplemented with added noise 216 (e.g., white gaussian noise) and passed into decoder1 226 and subsequently decoder2 228, the result of which is the prediction result Y-hat 260. According to one aspect, the decoder 1 226 input (parent 218, parent complement 220) and intermediate output from decoder 1 226 (child 222, child complement 224) is received at decoder2 228, and the output of decoder2

228 is taken to compute the loss term 234, which may be the distribution difference between with intervention 230 and without intervention of the child+parent tensor (i.e., the robustness loss, FIG. 2B). Accordingly, aspects of the disclosure provide for splitting up the decoder functions of the network.

Referring now to FIG. 2B, the process of prediction with intervention, according to aspects of the present disclosure, is shown. The input data consists of scenario data X 254 from one dataset 250 (Base set/Variation set #x) and predicate data 276 from another dataset 252. According to aspects of the present disclosure, this dataset 252 may be any other variation data set, other than the variation set #x. The model structure of the intervention prediction model 240 (FIG. 2B) is substantially similar to that of the standard prediction model, except after the predicate_encoder 278, the result may go through a reparameterization process 280, which may include computing the mean and variance (shown as Mean, Cov) of the result and sampling data from a gaussian noise model given those parameters. This reparameterization process may use parametric, gaussian-like distribution, and/or non-parametric distributions.

When training the models, according to aspects of the present disclosure, two types of losses may be used. According to the standard prediction model, the result of the prediction, Y hat 274, and ground truth 232, Y, may be used to compute the data loss 288. In the intervention model (FIG. 2B) the intermediate tensors, parent 264, complement 258, child 266, and child_complement 268, may be used to compute a robustness loss by computing the difference 288 between their distribution (e.g., mean, variance) 284 and 286, correlation, mutual information, or the like. At evaluation time, the model can run both normal prediction (FIG. 2A) and intervention prediction (FIG. 2B). The workflow maybe the same as training time.

Figure 3:
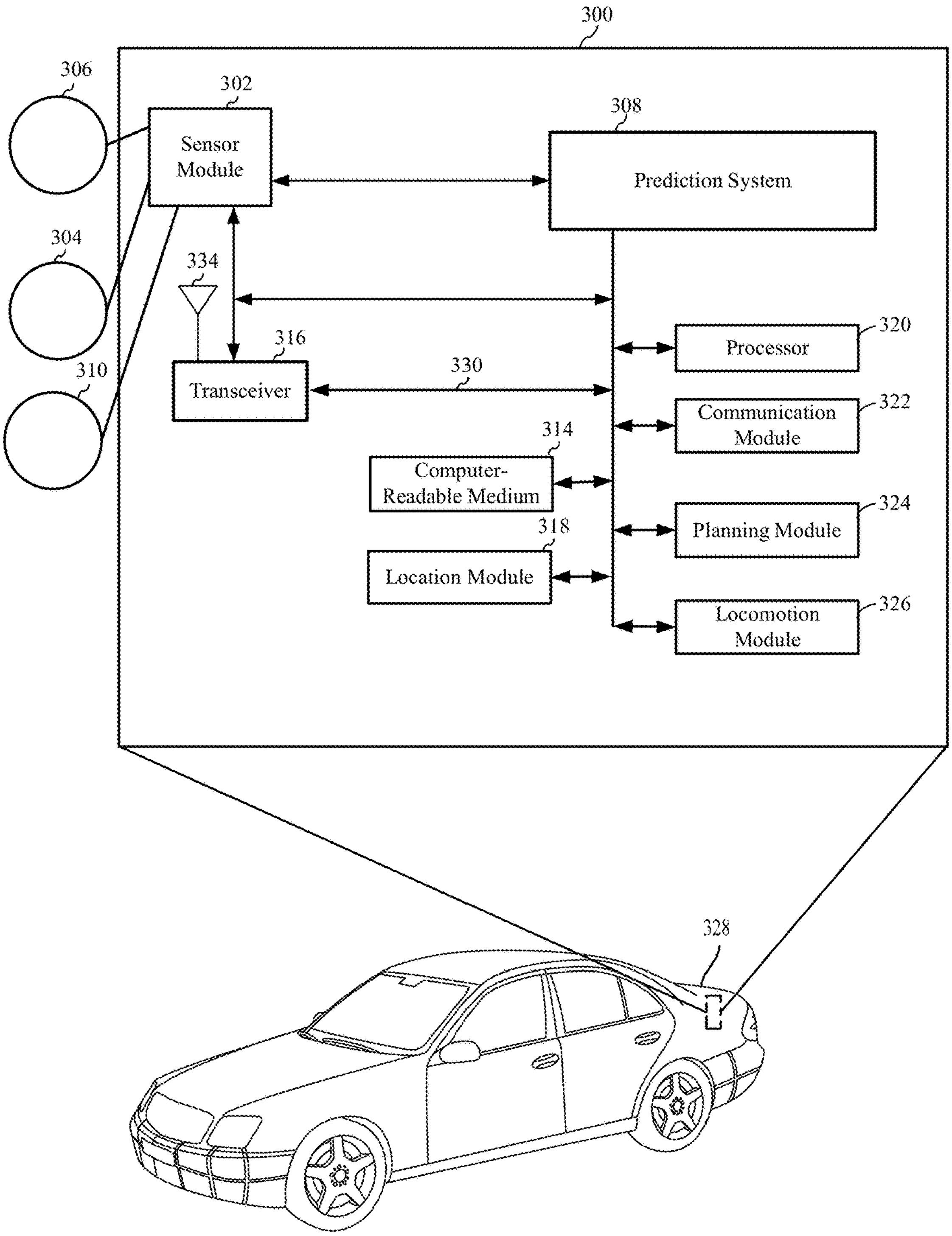
FIG. 3 is a diagram illustrating an example of a hardware implementation for an autonomous driving system 400, according to aspects of the present disclosure.

FIG. 3 depicts a diagram illustrating an example of a hardware implementation for a vehicle control system 300, according to aspects of the present disclosure. The vehicle control system 300 may be part of a passenger vehicle, a carrier vehicle, or other device. For example, as shown in FIG. 3, the vehicle control system 300 may be a component of an autonomous or semi-autonomous car 328. Aspects of the present disclosure are not limited to the vehicle control system 300 being a component of the car 328, as other devices, including, but not limited to, autonomous, semi-autonomous, or other probabilistic prediction or planning systems may also include and use the vehicle control system 300, particularly a prediction system 308, described herein.

The vehicle control system 300 may be implemented with a bus architecture, represented generally by a bus 330. The bus 330 may include any number of interconnecting buses and bridges depending on the specific application of the vehicle control system 300 and the overall design constraints. The bus 330 may link together various circuits including one or more processors and/or hardware modules, represented by a processor 320, a communication module 322, a location module 318, a sensor module 302, an actuation module 326, a planning module 324, and a computer-readable medium 314. The bus 330 may also link various other circuits such as timing sources, peripherals, voltage regulators, and power management circuits, which are well known in the art, and therefore, will not be described any further.

The vehicle control system 300 may include a transceiver 316 coupled to the processor 320, the sensor module 302, a prediction system 308, the communication module 322, the location module 318, the locomotion module 326, the planning module 324, and the computer-readable medium 314. The transceiver 316 is coupled to an antenna 334. The transceiver 316 communicates with various other devices over a transmission medium. For example, the transceiver 316 may send and receive commands via transmissions to and from a server or a remote device, such as remote device or server (not shown).

The prediction system 308 may include and/or communicate with the processor 320 coupled to the computer-readable medium 314. The processor 320 may perform processing, including the execution of software stored on the computer-readable medium 314 providing functionality according to the disclosure. The software, when executed by the processor 320, causes the vehicle control system 300 to perform the various functions described for a particular device, such as car 328, or any of the modules 302, 308, 314, 316, 318, 320, 322, 324, 326. The computer-readable medium 314 may also be used for storing data that is manipulated by the processor 320 when executing the software.

The sensor module 302 may be used to obtain measurements via different sensors, such as a first sensor 306, a second sensor 304, and a third sensor 310. The first sensor 306 may be a motion sensor, such as an accelerometer, gyroscope, inertial measurement unit, or the like. The second sensor may include a visual sensor, such as a stereoscopic camera, a red-green-blue (RGB) camera, LIDAR or RADAR. The third sensor 304 may be an in-cabin sensor, such as a camera, CCD, infrared sensor, or the like, configured to obtain images of an occupant of the car 328. Aspects of the present disclosure are not limited to the aforementioned sensors as other types of sensors, such as, for example, thermal, sonar, and/or lasers are also contemplated for either of the sensors 304, 306, 310. The measurements of the sensors 304, 306, 310, may be processed by one or more of the processor 320, the sensor module 302, the prediction system 308, the communication module 322, the location module 318, the actuation module 326, the planning module 324, in conjunction with the computer-readable medium 314 to implement the functionality described herein. In one configuration, the data captured by the first sensor 306, the second sensor 304, and the third sensor 306 may be transmitted to an external device via the transceiver 316. The sensors 304, 306, 310 may be coupled to the car 328 or may be in communication with the car 328.

The location module 318 may be used to determine a location of the car 328. For example, the location module 318 may use a global positioning system (GPS) to determine the location of the car 328. For example, the vehicle control system 300 may be able to communicate with a remote monitoring service, such as mapping/navigation service, a weather service, or other environmental information provider. Information obtained through the location module may assist in determining approaching changes in environmental conditions and ambient lighting conditions. The information received through and generated by the location module 318 may inform the prediction system 308 of environmental conditions or other trajectory-based data.

The communication module 322 may be used to facilitate communications via the transceiver 316. For example, the communication module 322 may be configured to provide communication capabilities via different wireless protocols, such as Bluetooth, Wi-Fi, long term evolution (LTE), 3G, 5G, or the like. The communications module may also be configured to establish a communication channel between the car 328 and an information provider. The communication module 322 may also be used to communicate with other components of the car 328 that are not modules of the prediction system 308.

The vehicle control system 300 may also include the planning module 324 for planning a response to a driver state. The planning module may interface with or be a part of the prediction system 308. The planning module 324 may include a set of instructions or settings that dictate how the vehicle control system 300 may respond when triggered by a change. For example, depending on the signals from any of the sensors 304, 306, 310 the planning module may respond with information necessary for the prediction system 308 to condition an alert according to such a state. The planning module 324, as well as other modules described herein, may be software modules running in the processor 320, resident/stored in the computer-readable medium 314, one or more hardware modules coupled to the processor 320, or some combination thereof.

The prediction system 308 may be in communication with the sensor module 302, the transceiver 316, the processor 320, the communication module 322, the location module 318, the locomotion module 326, the planning module 324, and the computer-readable medium 314. In one configuration, the prediction system 308 may receive sensor data from the sensor module 302. The sensor module 302 may receive the sensor data from the sensors 304, 306, 310. According to aspects of the disclosure, the sensor module 302 may filter the data to remove noise, encode the data, decode the data, merge the data, or perform other functions. In an alternate configuration, the prediction system 308 may receive sensor data directly from the sensors 304, 306, 310.

As shown in FIG. 3, the prediction system 308 may include or be in communication with the planning module 324 and/or the location module 318. The prediction system 308, as described herein, may include a machine learning training system configured to generate, use and modify prediction models on which the car 328 may operate and/or be otherwise controlled. As described herein the prediction system 308 may use small active datasets and use those variation datasets as loss terms that mimic intervention by replacing intermediate activations of a base dataset with intermediate activations based on the smaller variation data sets. Use of smaller variation data as loss terms may create more robust prediction models for application to operating the car 328. The prediction system 308 may include or be in communication with local or remote memory that may store driver data, profiles or learned behavioral models.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of training a prediction model, the method comprising:

retrieving a first dataset, the first dataset comprising a base set and a first variation dataset;

encoding, by a first encoder neural network, the first dataset to generate a first encoded dataset;

encoding, by the first encoder neural network, the base set to generate a complement encoded dataset;

retrieving a predicate dataset from a second dataset, the second dataset comprising a second variation dataset distinct from the first variation dataset;

encoding, by a second encoder neural network, the predicate dataset to generate an encoded predicate dataset;

concatenating the first encoded representation with the encoded predicate dataset to generate a concatenated dataset;

decoding the concatenated dataset to generate a child prediction result;

decoding the complement encoded data to generate a child complement prediction result;

determining a robustness loss as a function of a difference between a combination of the concatenated dataset and the child predication result and a combination of the complement encoded dataset and the child complement prediction result, the robustness loss indicating a robustness of the prediction model to dataset variation; and updating parameters of the prediction model based on the robustness loss.

2. The method of claim 1 further comprising reparametrizing the encoded predicate data prior to concatenating with the first encoded dataset.

3. The method of claim 2 wherein reparametrizing comprises computing a mean variance of the encoded predicate dataset.

4. The method of claim 2 wherein the reparametrizing comprises a parametric distribution.

5. The method of claim 2 wherein the reparametrizing comprises a non-parametric distribution.

6. The method of claim 1 further comprising supplementing the concatenated dataset with noise.

7. The method of claim 6 wherein the noise comprises gaussian white noise.

8. A system for training a prediction model, the system comprising:

one or more processors;

a memory communicably coupled to the one or more processors and storing a prediction systems, the prediction system including instructions that when executed by the one or more processors train the prediction model by:

retrieving a first dataset, the first dataset comprising a base set and a first variation dataset;

encoding, by a first encoder neural network, the first dataset to generate a first encoded dataset;

encoding, by the first encoder neural network, the base set to generate a complement encoded dataset;

retrieving a predicate dataset from a second dataset, the second dataset comprising a second variation dataset distinct from the first variation dataset;

encoding, by a second encoder neural network, the predicate dataset to generate an encoded predicate dataset;

concatenating the first encoded representation with the encoded predicate-dataset to generate a concatenated dataset;

decoding the concatenated dataset to generate a child prediction result;

decoding the complement encoded data to generate a child complement prediction result;

determining a robustness loss as a function of a difference between a combination of the concatenated dataset and the child predication result and a combination of the complement encoded dataset and the child complement prediction result, the robustness loss indicating a robustness of the prediction model to dataset variation; and updating parameters of the prediction model based on the robustness loss.

9. The system of claim 8 wherein execution of the instructions further cause the one or more processors to train the prediction model by reparametrizing the encoded predicate data prior to concatenating with the first encoded dataset.

10. The system of claim 9 wherein the reparametrizing comprises computing a mean variance of the encoded predicate dataset.

11. The system of claim 9 wherein the reparametrizing comprises a parametric distribution.

12. The system of claim 9 wherein the reparametrizing comprises a non-parametric distribution.

13. The system of claim 8 further comprising supplementing the concatenated dataset with noise.

14. The system of claim 13 wherein the noise comprises gaussian white noise.

15. A non-transitory computer-readable medium having program code recorded thereon for training a prediction model, the program code executed by a processor and comprising:

program code for retrieving a first dataset, the first dataset comprising a base set and a first variation dataset;

program code for encoding, by a first encoder neural network, the first dataset to generate a first encoded dataset;

program code for encoding, by the first encoder neural network, the base set to generate a complement encoded dataset;

program code for retrieving a predicate dataset from a second dataset, the second dataset comprising a second variation dataset distinct from the first variation dataset;

program code for encoding, by a second encoder neural network, the predicate dataset to generate an encoded predicate dataset;

program code for concatenating the first encoded representation with the encoded predicate-dataset to generate a concatenated dataset;

program code for decoding the concatenated dataset to generate a child prediction result;

program code for decoding the complement encoded data to generate a child complement prediction result;

program code for determining a robustness loss as a function of a difference between a combination of the concatenated dataset and the child predication result and a combination of the complement encoded dataset and the child complement prediction result, the robustness loss indicating a robustness of the prediction model to dataset variation; and program code for updating parameters of the prediction model based on the robustness loss.

16. The non-transitory computer-readable medium of claim 15 wherein the program code further comprises program code for reparametrizing the encoded predicate data prior to concatenating with the encoded first dataset.

17. The non-transitory computer-readable medium of claim 16 wherein the reparametrizing comprises computing a mean variance of the encoded predicate data.

18. The method of claim 1, wherein:

the base set comprises data collected from autonomous operation of an autonomous vehicle; and the first variation dataset comprises data collected from manual operation of a vehicle.

19. The system of claim 8, wherein:

the base set comprises data collected from autonomous operation of an autonomous vehicle; and the first variation dataset comprises data collected from manual operation of a vehicle.

20. The non-transitory computer-readable medium of claim 15, wherein:

the base set comprises data collected from autonomous operation of an autonomous vehicle; and the first variation dataset comprises data collected from manual operation of a vehicle.

* * * * *